United States Patent
Said

(10) Patent No.: US 8,828,233 B2
(45) Date of Patent: Sep. 9, 2014

(54) VESSEL DESALINATION SYSTEM AND METHOD

(75) Inventor: Hany Armia Said, Laguna Hills, CA (US)

(73) Assignee: MegaVessals, Inc., Santa Fe Springs, CA (US)

(\*) Notice: Subject to any disclaimer, the term of this patent is extended or adjusted under 35 U.S.C. 154(b) by 665 days.

(21) Appl. No.: 13/177,433

(22) Filed: Jul. 6, 2011

(65) Prior Publication Data

US 2012/0006749 A1    Jan. 12, 2012

Related U.S. Application Data

(60) Provisional application No. 61/361,888, filed on Jul. 6, 2010.

(51) Int. Cl.

| | |
|---|---|
| B01D 61/00 | (2006.01) |
| B01D 63/00 | (2006.01) |
| C02F 1/00 | (2006.01) |
| B01D 61/02 | (2006.01) |
| C02F 1/44 | (2006.01) |

(52) U.S. Cl.
CPC ............. B01D 61/022 (2013.01); C02F 1/44 (2013.01)
USPC .................. 210/652; 210/321.6; 210/321.74; 210/321.83; 210/433.1

(58) Field of Classification Search
CPC .. B01D 2311/04; B01D 63/10; B01D 61/022; B01D 2319/022; B01D 2317/022; B01D 63/046; C02F 1/006
USPC ......... 210/652, 321.6, 321.74, 321.8, 321.83, 210/321.87, 433.1, 435; 96/4
See application file for complete search history.

(56) References Cited

U.S. PATENT DOCUMENTS

| | | | | |
|---|---|---|---|---|
| 3,774,771 | A | * 11/1973 | Manjikian et al. | ........ 210/321.87 |
| 4,070,280 | A | * 1/1978 | Bray | .............................. 210/636 |
| 4,083,780 | A | * 4/1978 | Call | .............................. 210/652 |
| 4,452,705 | A | 6/1984 | Herrmann | |

(Continued)

FOREIGN PATENT DOCUMENTS

| | | |
|---|---|---|
| JP | 56-044006 A | 4/1981 |
| JP | 10-156356 A | 6/1998 |

OTHER PUBLICATIONS

The International Search Report dated Feb. 29, 2012 in the co-pending International Application No. PCT/US2011/043089.

*Primary Examiner* — Ana Fortuna
(74) *Attorney, Agent, or Firm* — Thomas A. Runk; Fulwider Patton LLP

(57) ABSTRACT

A multi-ported vessel system includes an outer pressure vessel containing a plurality of flow distribution tubes, each of which comprises a plurality of reverse osmosis membrane elements aligned serially within each tube. The outer pressure vessel includes bypass flow paths whereby feed water flows around each of the tubes within the vessel. Slots are disposed in the flow distribution tubes at the upstream end of each RO membrane element such that feed water reaches all RO membrane elements of the tubes in parallel. The serial alignment of the membranes also allows for serial water processing also. A product water tube collects the purified water from the reverse osmosis elements and provides it to a product water port. Brine water is provided to an output port to be discarded of for further processing. The parallel processing of feed water by all membrane elements results in increased productivity and reduced costs.

18 Claims, 9 Drawing Sheets

(56) References Cited

U.S. PATENT DOCUMENTS

| | | | |
|---|---|---|---|
| 5,470,469 A * | 11/1995 | Eckman | 210/321.8 |
| 6,007,723 A * | 12/1999 | Ikada et al. | 210/650 |
| 6,375,842 B1 | 4/2002 | Graham | |
| 7,144,511 B2 | 12/2006 | Vuong | |
| 7,338,601 B2 * | 3/2008 | Schott et al. | 210/321.74 |
| 7,459,084 B2 | 12/2008 | Baig et al. | |
| 7,718,921 B2 * | 5/2010 | Dane et al. | 219/121.73 |
| 7,758,670 B2 * | 7/2010 | Wynn et al. | 95/45 |
| 2005/0194317 A1 * | 9/2005 | Ikeyama et al. | 210/652 |
| 2006/0070940 A1 * | 4/2006 | Colby et al. | 210/321.74 |
| 2009/0194471 A1 | 8/2009 | Criville | |

* cited by examiner

FIG. 2  Membrane Flux and Concetrate Salinity Changes in Conventional RO Vessel

FIG. 3  RO Membrane Train with Conventional 8-inch Pressure Vessels

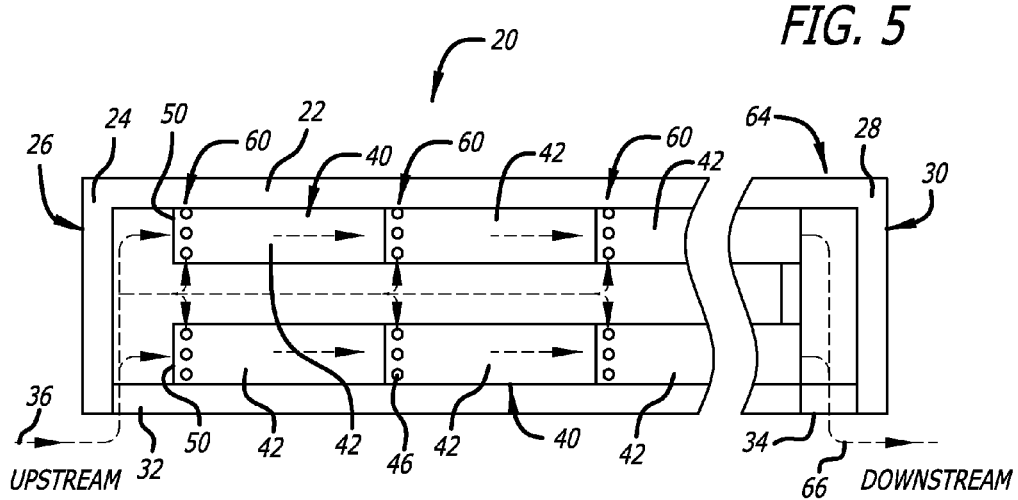

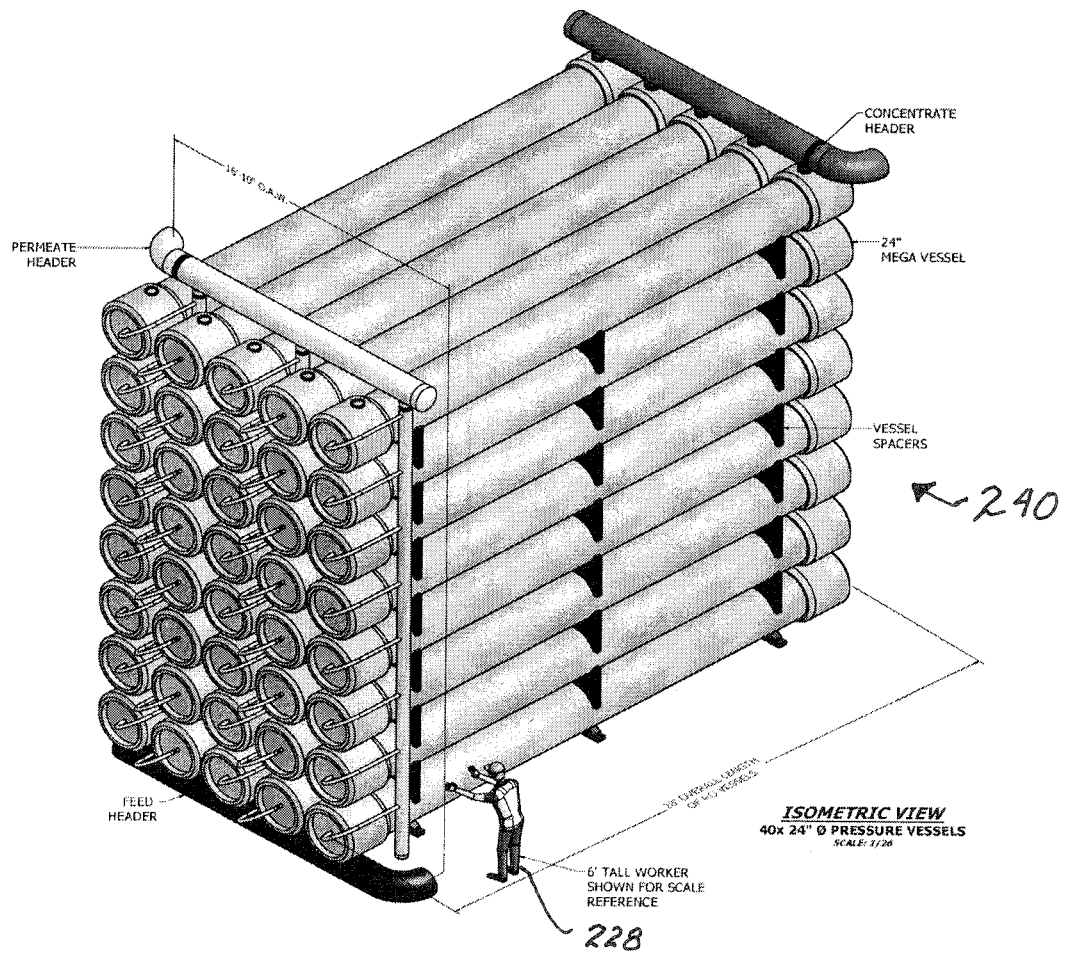
FIG. 12  RO Membrane Train with Mega-Vessels

VESSEL DESALINATION SYSTEM AND METHOD

CROSS-REFERENCES TO RELATED APPLICATION

This application claims the benefit of U.S. Application No. 61/361,888, filed Jul. 6, 2010, currently pending, which is incorporated by reference in its entirety herein.

BACKGROUND

The invention relates to fluid processing and, more particularly, to a system and method directed to purifying water.

The necessity of water for sustaining life, combined with the limited supply of usable potable water, make water a valuable resource or commodity in numerous parts of the world. Many areas of the world have repeatedly experienced water shortages and droughts. The lack of water, or use of poor quality water, can cause and transmit life-threatening diseases such as malaria, cholera, diarrhea, typhoid, hepatitis, dysentery, and others. Even in prosperous agricultural areas, water rights and shares cause disputes, conflicts, and litigation.

Despite its essential nature, fresh water is a declining resource. Various factors contribute to a decreasing global water supply and as the population continues to grow, less water is available per person from existing water sources. The world's fresh water consumption is increasing exponentially, putting extreme pressure on this limited resource that has reached delivery capacity owing to its usage in supporting continued population growth, increasing irrigation for agriculture, consumption required by energy production, and ecosystem replenishment. These factors, coupled with recurrent and unpredictable drought events, cause the world's fresh water supply to be facing shortages and phenomenal challenges in equitable distribution. There is presently an urgent need to address water supply solutions worldwide.

The United Nations Population Fund expects the global consumption of water to double every twenty years. The U.S. alone uses an average of 402 billion gallons/day. Yet just 3% of the world's water is fresh water and with 2% of that located in the polar ice caps; less than 1% resides in freshwater lakes and streams.

Climate change, droughts, growing populations and increasing industrial demand are straining the available supplies of fresh water. In 1995, over 400 million people lived in countries experiencing water stress or water scarcity. By 2025, that number is expected to rise to four billion—over half the world's population growth is expected to take place in water-stressed countries. Over 70% of irrigation and 80% of domestic water use currently comes from groundwater, which is rapidly being depleted.

A study conducted by the International Water Management Institute projects that by 2025, 33% of the population of the developing world will face severe water shortages. Assuming current consumption patterns continue, by 2025, at least 3.5 billion people will live in river basins under "water stress," with 2.4 billion of them in "severe water stress" areas—including the Colorado River basin in the U.S. Lack of high-quality water supplies is also expected to hinder further industrial growth and economic progress in the developing world. Uneven geographic distribution of fresh water supplies compounds this problem. It takes about one liter of water to produce one calorie of food. As prosperity around the globe increases, so does the demand for high-protein, water intensive food. Since it takes approximately nine liters of water to produce one calorie of energy, (whether by using oil, biofuels or by other sources and means), future population growth will not only propel agricultural water use but will also intensify rates of water use for power generation for heat, light, transport, and industrial production that are unseen before.

The global water supply/demand imbalance is increasing mainly due to population growth, particularly in arid, water-short regions, which typically suffer from contamination of water sources and inefficient utilization of available supplies. Increasingly, futurists are predicting a world where water shortages, exacerbated by global warming, could cause increased food imports, population shifts, domestic political unrest, and geopolitical conflict.

As the potential for future crisis rises each year, calls to address water supply issues are becoming more urgent, though political action to change these trends has so far been muted. Based on data from the World Resources Institute, the United Nations Environment Program, and the Center for Strategic and International Studies water issues are expected to become of ever greater importance in the future because of the following concerns:

The water supply is finite. Water is re-circulated through the atmosphere, but no "new" water is being created;
15-35% of agricultural water withdrawals are in excess of sustainable limits;
Industrial withdrawals are expected to rise by 55% by 2025;
Despite efforts by global governments, nearly 1.1 billion people still lack access to water supply services;
By 2050, untreated wastewater could contaminate one-third of global annual renewable freshwater supplies;
The world's population has tripled in the 20th century—but global water use has grown six-fold;
Another 40-50% in population growth is expected within 50 years, along with increasing urbanization and industrialization, with the fastest growth taking place in water-short areas, including the American Southwest, China, and India.

As the world faces water supply crisis, inventors, industrialists, and investors are pressing the marketplace to discover new technologies and partake in refinement of existing technologies that will avert crisis by cultivating water as a durable and valuable asset.

Many solutions have been proposed to remedy the dwindling water supply. Such solutions include water conservation programs and devices, and the construction of new reservoirs and pipelines. However, these proposals are limited in their ability to significantly expand fresh water availability because naturally occurring fresh water resources are finite. Globally, virtually all of the traditional water sources have already been developed and heavily used. To meet this ever increasing demand, municipalities, private water districts, and industry are increasingly looking to the application of advanced technology to produce high quality water from very untraditional sources. The most viable and sustainable new water sources include ocean and brackish water desalination. Seawater desalination offers a practically unlimited source of water supply.

Desalination as a method to increase the availability of fresh water resources is expanding rapidly due to its potential to convert the largest source of water, the oceans, into high quality potable water. There are numerous methods to achieve desalination of water including solar stills, various methods of distillation, freezing, electro-dialysis and others, but the reverse osmosis ("RO") method has increasingly gained wide-spread use because it has been demonstrated to produce very high quality treated water in the most economical manner. RO desalination is in widespread use around the world for the treatment of brackish and seawater feed stocks and to reclaim municipal waste water to produce high quality water for drinking, agriculture, and industrial processes.

Despite its promise and substantial potential, desalination, whether by RO or another method, has failed to emerge as the prevailing source of expanding fresh water supplies, except in regions of the world where naturally-occurring fresh water sources are simply not available, such as in many parts of the Middle East and North Africa. To date, desalination technology has been encumbered with complex designs, incorporating multiple components that decrease efficiencies in the installation, energy use, monitoring, operation and maintenance—all of which impact immediate and long term water production costs. Furthermore, these older technologies come with inherent inefficiencies, and energy costs can be the single largest operating costs in the desalination process. The biggest factor prohibiting more widespread use of desalination is the high cost associated with the process when compared to traditional sources. Reverse osmosis requires large amounts of energy to generate the high pressures necessary for the process to work efficiently. Fossil fuel energy systems typically power RO systems and correspondingly these systems generate pollution and consume finite resources. These costs often make the use of desalination cost-prohibitive. Furthermore, many of these systems require large areas of land, which is usually unavailable or cost-prohibitive in coastal areas with large populations. In fact, land costs have been identified as one of the largest costs of desalination.

For convenience, a list of terms used herein is included at the end of the specification.

The reverse osmosis method of desalination utilizes a semi-permeable polymer membrane typically in a spiral-wound or hollow-fiber element configuration ("RO Element"), which rejects salts to a high degree while allowing pure water molecules ("permeate" or "product") to pass through under pressure. To produce purified water, the pressure applied to the feed side of the RO membrane must be greater than the natural osmotic pressure of the feed water, commonly referred to as the net driving pressure ("NDP"). The greater the NDP between the feed side and the permeate side of the semi-permeable membrane, the greater the permeability of the membrane and thus the volume of purified water produced per given area of membrane. This rate at which permeate is produced is typically referred to as "permeate water flux" and is expressed in either gallons per square foot per day ("GFD") or liters per square meter per hour ("LMH"). There is a direct correlation between the NDP and the permeate flux.

Referring now to FIG. 1, conventional membrane salt separation systems used in most desalination plants at present consist of individual commoditized pressure vessels 200 that house identical standard-size 8-inch RO elements 202. The RO membrane elements are installed in series of seven or eight membranes per 8-inch pressure vessel and the entire volume of saline water processed in the vessel is fed to the first, or farthest upstream, RO element. As used herein, "upstream" refers to the feed input end of a vessel at which the first filter element is located and "downstream" refers to the end at which the last filter element is located which also often includes the concentrate outlet or discharge end of the vessel.

A significant loss of energy and productivity in the RO system is caused by the uneven distribution of flow and salinity fed to the individual membrane elements inside the RO pressure vessels. In brackish water reverse osmosis (BWRO) systems, such energy loss could reach 15% to 25% of the total energy used for desalination. In seawater reverse desalination plants the energy loss associated with uneven feed flow and salinity distribution is typically in a range of 10% to 20% of the total energy applied for salt separation. The uneven feed flow and salinity distribution to the individual RO elements within a given pressure vessel not only causes less efficient use of the energy applied for desalination, but also results in a lower total fresh water production rate from the RO elements.

Membrane RO elements of a typical SWRO system are also installed in cylindrical housings, often referred to as membrane pressure vessels. Usually, six to eight SWRO membrane elements are housed in a single membrane vessel such as that shown in FIG. 1. The untreated feed saline water is pressurized and enters the feed (front) end of the pressure vessel through a feed inlet port. The RO membrane elements are designed to collect the desalinated water (permeate) in a central collection tube while rejecting a large portion of the salts contained in the saline source water.

As the feed water passes down the length of the RO membrane elements operating in series, the mix of remaining feed water and concentrate (brine) exiting the first element becomes the feed for the second RO element, the saline source-concentrate mix exiting the second element becomes a feed water to the third element, etc., until the last element which receives the concentrate from all upstream RO elements as a feed water. The concentrate from the last RO element exits the pressure vessel and is directed to the RO system energy recovery system or conveyed for disposal.

More particularly, with the present state of the art, spiral wound RO membrane elements are housed in individual pressure vessels each of which contain a plurality of membrane elements operating in series. The untreated feed water is pressurized and enters the feed-end of the pressure vessel through the feed inlet port. The RO membrane elements allow purified water to pass through while rejecting a very high percentage of the dissolved solids. As the feed water passes down the length of the RO membrane elements operating in series, the brine or concentrate exiting from the first element becomes the feed for the second element in series and the brine exiting from the second element in series becomes the feed water for the third element, etc. Because purified water is being extracted from each RO membrane element operating in series, the feed/brine stream is increasing in concentration as it moves down the length of the pressure vessel and exits the pressure vessel at substantially greater osmotic pressure than the initial unpurified feed water. Because the feed/brine is concentrating as it moves down the length of the pressure vessel, the NDP is reduced for each sequential RO membrane element operating in series, and the GFD is correspondingly reduced. With the present state of the art, the lead RO membrane elements will produce 20% to 25% of the total permeate flow from a single pressure vessel while the tail-end RO membrane elements will produce only 5% to 7% of the total flow. This effect also produces a differential pressure between the lead and tail-end RO membrane elements thus consuming more energy than if the flow conditions were optimized.

Referring again to FIG. 1, traditionally, all of the feed seawater is introduced at the front 204 of the membrane vessel and all permeate and concentrate are collected at the back end 206. As a result, the first (front) membrane element is exposed to the entire vessel feed flow and operates at production rate (flux) significantly higher than that of the subsequent membrane elements. With a typical configuration of seven elements per vessel and ideal uniform saline feed water flow distribution to all RO elements, each membrane element would produce one-seventh (14.3%) of the total permeate flow of the vessel. However, in actual RO systems, the flow distribution in a vessel is uneven because all the feed water to each vessel has to pass through the first element and downstream RO elements have to process the concentrate generated by all upstream membranes. Referring now to the graph depicted in FIG. 1, as a result the first membrane element usually produces over 25% of the total vessel permeate flow, while the last element only yields 6 to 8% of the total vessel permeate.

As shown in FIG. 2, the decline of permeate production along the length of the membrane vessel is mainly due to the increase in feed salinity and associated osmotic pressure as permeate is removed from every RO element in the vessel while the concentrate rejected from all elements remains in the vessel until it exits the last element. This flux decline results in underuse of the last three RO elements in the pressure vessel and in permeate over-production (very high flux) and excessive energy loss in the first two elements.

It should be pointed out that each type and model of RO membrane element has a maximum flux (feed flow) and minimum concentrate flow that it can handle. These RO membrane element parameters are specified by the membrane manufacturer. Operation of RO membrane elements at flux exceeding the maximum level prescribed by the manufacturer would result in a very high pressure drop through the element and potential subsequent structural damage. Therefore, the unbalanced permeate flow production pattern in the conventional RO vessels not only causes energy inefficiencies but also limits the total amount of fresh water that can be produced by the membranes in a RO vessel.

In order to understand why the uneven membrane flow distribution in the conventional RO systems has a negative impact on energy and/or productivity of the membranes it is important to note that the energy needed to produce certain volume of fresh water by RO desalination is proportional to the feed water pressure:

$$E_{desal}=(0.0277 \times P_{feed} \times Q_{feed})/(Eff_{pump} \times Eff_{motor}) \quad (1)$$

Where: $E_{desal}$=energy for RO pumping in kWh;
$P_{feed}$=the feed pressure to the RO vessels, in bars;
$Q_{feed}$=the pump feed water flow rate in m³/hr; and
$Eff_{pump}$ and $Eff_{motor}$=the efficiencies of the feed pump and motor, respectively.

For a desalination system operating at a design steady-state mode, all other parameters remain the same, except for the feed pressure, $P_{feed}$. In RO system where each membrane element of each vessel receives saline feed water of the same flow and the same salinity, the feed pressure needed to produce the same volume of fresh water per element will be approximately the same and will equal to $P_{feed}$:

$$P_{feed}=NDP+P_{osf}+P_p+0.5 \times \Delta P - P_{osp} \quad (2)$$

Where: NDP=the net driving pressure which is needed to transport the fresh water (permeate) flow through the RO membrane;
$P_{osf}$=the average feed osmotic pressure;
$P_p$=the permeate pressure; and
$\Delta P$=the pressure drop across the RO element; and $P_{osp}$ is the osmotic pressure of permeate.

The average feed osmotic pressure, $P_{osf}$ is directly proportional to the concentration of the feed salinity and the concentrate salinity. The pressure drop (differential pressure-$\Delta P$) is mainly caused by the hydraulic losses resulting from the movement of the feed/concentrate blend in the spacer cavity across the length of the membrane elements. Osmotic pressure of permeate ($P_{osp}$) it typically the smallest fraction of the feed pressure.

It should be pointed out that the RO membrane element productivity, $F_p$ (i.e., fresh water flow produced per unit surface of membrane area—also known as permeate flux) is directly proportional to the NDP applied to the membrane element:

$$F_p=NDP \times A \quad (3)$$

Where: A=a water transport (permeability) coefficient of the membrane, which is a constant unique for the specific membrane type and material.

Equation (3) clearly shows that the higher the NDP applied to the membrane elements the more fresh water will they produce and vice versa.

Review of equations (2) and (3) indicates that for a given constant amount of energy applied for desalination (i.e., constant feed pressure $P_{feed}$ and feed flow, $Q_{feed}$), the volume of fresh water produced by each membrane element will be directly proportional to the NDP applied to this element. If the feed pressure is constant, the NDP will mainly be determined by the average feed osmotic pressure, which in turn will be directly proportional to the salinity of the feed water and the concentrate.

As shown on FIG. 2, in RO systems with conventional pressure vessels, the salinity of the concentrate and feed water increase from the first to the last RO element in the vessel. As a result the NDP, and therefore the productivity (flux) of the RO elements in conventional RO desalination systems decrease from the front end 204 to the back end 206 of the vessel 200. Because the NDPs of the individual membrane elements within a conventional pressure vessel can vary as much as 20% to 60% between the lead (farthest upstream) RO element and the tail (farthest downstream) RO element in the vessel, the NDP and productivity (flux) of the membrane elements are not optimized.

The first RO membrane element operating in series has a greater NDP and thus higher permeability than the last RO membrane element operating in series. It is well known among those practicing the art that RO membrane elements, which operate at higher permeate flux, are substantially more susceptible to membrane fouling than RO membrane elements operating at a lower permeate flux. Membrane element fouling greatly reduces permeability thus resulting in higher energy consumption, reduced operating life and more frequent maintenance for membrane cleaning. Therefore, those practicing the art limit the operating flux (GFD) to industry acceptable levels.

As NDP and flux through the subsequent elements are decreased and feed water salinity is increased, the possibility for mineral scale formation increases because the concentration of salts in the boundary layer near the membrane surface also increases. Therefore, the last two RO elements are typically more prone to mineral scaling than the other types of fouling.

Because particulate and microbial fouling rates of RO membranes are proportional to the applied membrane NDP and permeate flux, the first two elements are often exposed to significant fouling because of the uneven feed flow pattern through conventional pressure vessels. As membrane fouling occurs, in order to maintain membrane productivity (flux) and water quality constant, the desalination system would need to be operated at increasingly higher feed pressure, which in turn means that the energy needed to produce the same volume and quality of fresh water would need to be increased.

Because the NDPs can vary by as much as 20% between the lead (farthest upstream) RO membrane element and the tail (farthest downstream) RO membrane element operating in series in a pressure vessel, the operating parameters with respect to NDP and GFD are not optimized. This leads to energy consumption that is greater than if the operating characteristics were more uniform for each RO membrane element operating in series within a pressure vessel.

The ratio of the volume of desalted permeate water to the volume of total unpurified feed water entering a pressure vessel is the water recovery produced by the process and is usually expressed as a percentage. In sea water desalination, permeate recovery is typically limited to 50% or less water recovery because of insufficient available NDP at the tail end of the process. The greater the water recovery, the less energy is consumed per given volume of desalted water. Energy costs represent the single largest operating cost component of any desalination process. Inventions that reduce the energy consumed by the RO desalination process will substantially reduce the cost of desalinating water.

Land acquisition and building construction costs represent the single largest capital cost component of the RO desalination process. Inventions that reduce the footprint of the RO desalination process would substantially reduce the cost of desalinating water. Shown in FIG. 3 is a prior art membrane train 220 having conventional eight-inch pressure vessels joined together with feed headers 224, permeate headers 226, and other "plumbing" devices. The picture of a six-foot tall worker 228 is included to obtain a perspective on the size of the train. In this embodiment, there are two-hundred and seventy-five eight-inch pressure vessels in two tiers that form a "footprint" of 7.70 meters by 7.62 meters for a total of 58.67 $m^2$ (25.25 feet by 25.00 feet for a total of 631.25 $ft^2$).

At present, one of the most widely used ultrafiltration (UF) membrane systems in the field of seawater pretreatment, wastewater reclamation and treatment of surface fresh water sources (rivers, lakes, reservoirs, etc.) is the Norit X-flow UF system. The configuration of this system is similar to that of RO desalination systems—it consists of membrane trains with eight-inch pressure vessels with four UF elements in series. All feed source water processed in each vessel is introduced into the first UF element. This unbalanced feed flow pattern creates challenges similar to these which occur in standard eight-inch RO pressure vessels: hydraulic overloading and accelerated fouling rates of the front elements as well as high friction related energy losses along the length of the UF vessels. The hydraulic and fouling challenges for this UF system are exacerbated by the fact that this system usually operates at five- to ten-time higher average fresh water production flux as compared to that of SWRO systems. The high friction headlosses and reduced membrane productivity along the length of the pressure vessels are some of the key reasons why the Norit UF system pressure vessels contain only four membrane elements (modules) rather than seven or eight elements in series as it is in RO systems.

Despite the adoption of desalination and particularly seawater desalination utilizing RO as a method to augment global fresh water supplies, the high cost of all of the commercially available methods greatly limits the potential of desalination to truly solve the coming global water crisis. There remains a significant need for new inventions that will reduce the cost of desalination to make it more affordable, more efficient, to use less power, and to use less land for producing potable water supplies, and thereby expand its application and use around the world. The present invention addresses these needs and others.

Hence, those skilled in the art have identified a need for a more efficient desalination system where energy costs are reduced. A need for a smaller system capable of outputting higher volumes than prior systems, so that land use is reduced, has also been identified. The invention herein addresses these needs and others.

SUMMARY OF INVENTION

Briefly and in general terms there is provided a desalination system for desalinating feed water, the desalination system comprising an outer pressure vessel having a feed inlet and a product water outlet, a plurality of flow distribution tubes disposed within the outer pressure vessel, each flow distribution tube having an outer surface, a plurality of filter elements arranged within the flow distribution tube, a plurality of flow distribution slots formed through the outer surface of the flow distribution tube aligned with a plurality of the filter elements disposed within the tube to communicate feed water to the aligned filter elements, a product water tube configured to collect purified water from filter elements and communicate the purified water to the product water outlet, and a bypass flow path formed within the outer pressure vessel in contact with each flow distribution tube, the bypass flow path connected with the feed inlet so that feed water flows around the outer surfaces of the flow distribution tubes, whereby feed water is available to each filter element that is aligned with a flow distribution slot.

In more detailed aspects, the filter elements are oriented within each flow distribution tube serially, and in further detail, each filter element has an upstream end and a downstream end and the filter elements are oriented within each flow distribution tube in an end-to-end configuration. A plurality of filter elements have a serial inlet slot at their upstream ends through which feed water may flow into said filter elements from downstream ends of previous filter elements, in addition to inlet water flowing into said filter elements through flow distribution slots. In addition, each flow distribution tube has an upstream end and a downstream end with flow distribution slots formed in the outer surface at the upstream end having smaller openings than the openings of flow distribution slots formed at the downstream end.

Yet further detailed aspects include the flow bypass path being configured so that inlet water flows around all distribution tubes approximately simultaneously. All filter elements of each flow distribution tube are aligned with radial flow distribution slots whereby inlet water from the flow bypass path is available to all filter elements approximately simultaneously. Inlet water is available approximately simultaneously to the plurality of filter elements having aligned flow distribution slots. A plurality of flow distribution slots are aligned with each filter element.

Yet more detailed aspects include filter elements having a serial inlet through which feed water may flow from a previous filter element, and a serial outlet out of which processed feed water may flow to a downstream filter element, in addition to feed water flowing into the filter element through a radial flow distribution slot. Each filter element has an upstream end at which the radial slots are formed such that feed water will flow into the filter element at its upstream end and be filtered while traversing the filter element. Each flow distribution tube has an upstream end and a downstream end with flow distribution slots formed in the outer surface at the upstream end having smaller openings than the openings of flow distribution slots formed at the downstream end. In a further detailed aspect, the filter elements comprise reverse osmosis membrane elements.

In yet further detailed aspects, there is provided a desalination system for desalinating feed water, the desalination system comprising an outer pressure vessel having a feed inlet and a product water outlet, a plurality of flow distribution tubes disposed within the outer pressure vessel, each flow distribution tube having an outer surface, a plurality of filter elements arranged in an end-to-end configuration within the flow distribution tube, a plurality of radial flow distribution slots formed through the outer surface of the flow distribution tube aligned with each of the filter elements disposed within the tube to communicate feed water to the aligned filter elements, wherein the filter elements have a serial inlet slot at an upstream end through which feed water may flow into said filter element from downstream ends of previous filter elements, wherein each flow distribution tube has an upstream end and a downstream end with the radial flow distribution slots formed in the outer surface at the upstream end having smaller openings than the openings of flow distribution slots formed at the downstream end, a product water tube configured to collect purified water from filter elements and communicate the purified water to the product water outlet, and a bypass flow path formed within the outer pressure vessel in contact with each flow distribution tube, the bypass flow path connected with the feed inlet so that feed water flows around the outer surfaces of the flow distribution tubes approximately simultaneously and enters each of the radial flow distribution slots, whereby feed water is available to each filter element approximately simultaneously.

In another detailed aspect, the filter elements comprise reverse osmosis membrane elements.

In accordance with method aspects, there is provided a method of desalinating feed water, the method comprising directing pressurized feed water into a plurality of individual filter elements arranged serially within a flow distribution tube, the flow distribution tube having an upstream end and a downstream end, wherein the step of directing includes introducing feed water into the upstream end of the flow distribution tube, wherein the step of directing also includes introducing feed water directly into the individual filter elements in parallel, conducting the feed water serially through the individual filter elements, filtering the feed water by the filter elements one by one in series, mixing feed water introduced into the filter elements in parallel with the serially filtered water in the filter elements whereby salinity concentration is lowered in said filter elements, collecting purified water from the filter elements, and outputting the purified water.

Further detailed method aspects of the above include the step of introducing feed water directly into the individual filter elements in parallel comprising introducing more feed water directly into the individual filter elements that are located downstream than the amount of feed water introduced directly to the more upstream individual filter elements. Additionally further aspects include the steps of directing pressurized feed water into a plurality of flow distribution tubes, each tube having individual filter elements arranged serially, each flow distribution tube having an upstream end and a downstream end, wherein the step of directing includes introducing feed water into the upstream end of each of the flow distribution tubes approximately simultaneously, wherein the step of directing also includes introducing feed water directly and separately into all the individual filter elements of the plurality of flow distribution tubes in parallel approximately simultaneously, conducting the feed water serially through the individual filter elements, filtering the feed water by the filter elements one by one in series, mixing feed water introduced into the filter elements in parallel with the serially filtered water in the filter elements whereby salinity concentration is lowered in said filter elements, collecting purified water from all the filter elements, and outputting the purified water.

In yet a further aspect, the step of filtering feed water comprises filtering by reverse osmosis.

Further features and/or variations of the invention may be provided in addition to those set forth herein. For example, the present invention may be directed to various combinations and subcombinations of the disclosed features and/or combinations and subcombinations of several further features disclosed below in the detailed description.

BRIEF DESCRIPTION OF THE DRAWINGS

FIG. 5 is a schematic view of part of the flow path of inlet unpurified water showing end-on axial flow directly into RO membrane elements at the upstream end and bypass flow around those elements for entry into the same membrane elements through their radial flow distribution slots to balance osmotic pressure and dilute brine concentration in more downstream membrane elements, the figure also showing concentrate/brine water outlets;

FIG. 6 is a simplified cut-away end-on view of the multi-ported vessel of FIG. 4 showing seven tubes in the vessel and bypass flow paths around the flow distribution tubes that permit inlet unpurified water to enter the RO membrane elements through radial flow distribution slots (not shown);

FIG. 12 shows a train of RO vessels in accordance with aspects of the invention.

These and other advantages of the invention will become apparent from the following more detailed description when taken in conjunction with the accompanying drawings of illustrative embodiments.

DETAILED DESCRIPTION OF PREFERRED EMBODIMENTS

Figure 4:
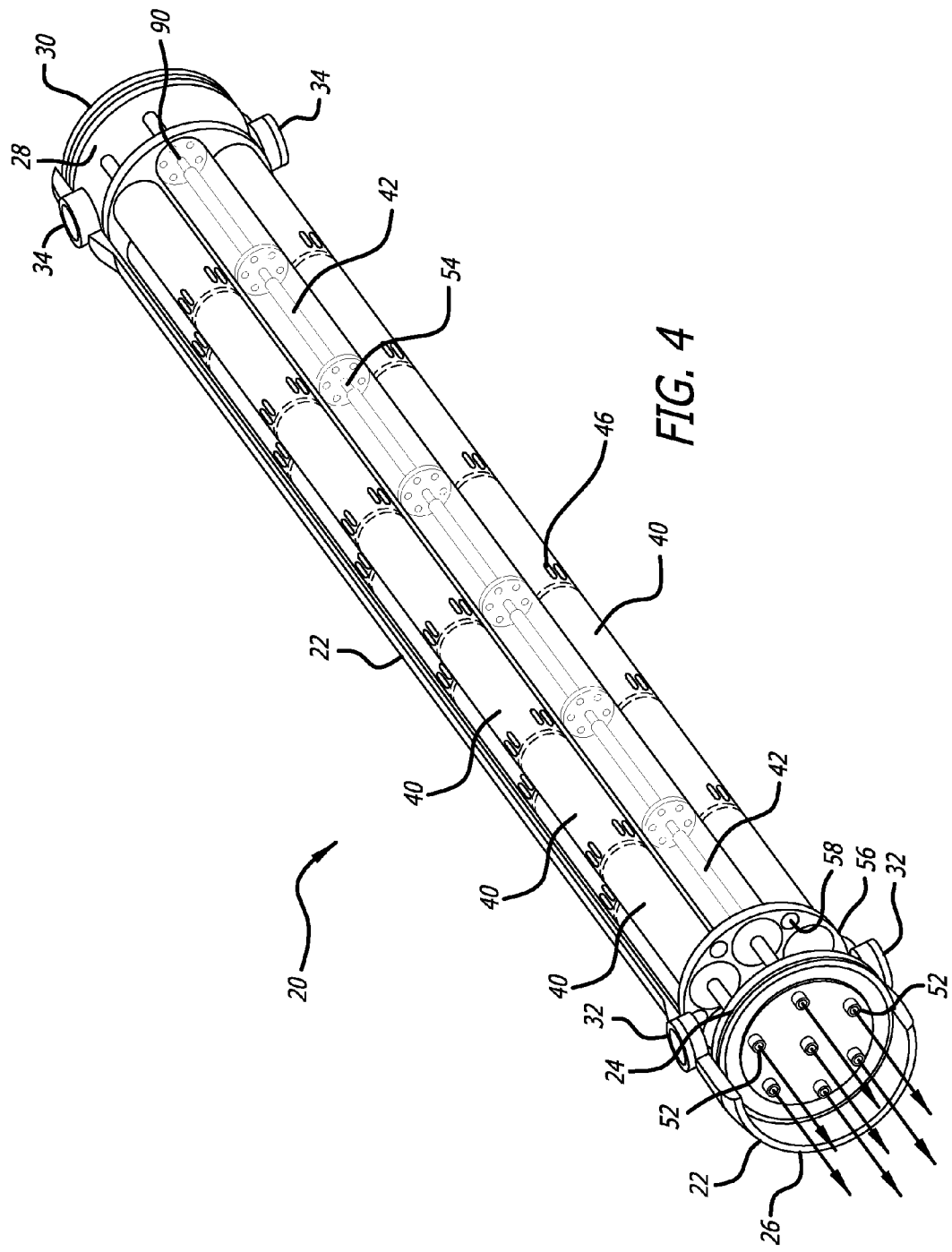
FIG. 4 provides a perspective, partially cut-away view from the feed inlet of a multi-ported vessel in accordance with aspects of the invention showing certain internal and external features.

Referring now to the drawings in further detail, in which like references numerals indicate corresponding or identical features among the figures, there is shown in FIG. 4 a multi-ported vessel system 20 in accordance with aspects of the invention, which includes an outer pressure vessel 22 within which are located a plurality of individual flow distribution tubes 40, each of which contains a plurality of filter elements 42, which in this embodiment are individual RO membrane elements 42 arranged end-to-end. Although only a few of the RO membrane elements are indicated by the numeral 42, all are meant to be indicated. Numerals and lead lines to each of these elements have been left off to preserve clarity of the drawing. In this case, seven tubes 40 exist each having seven membrane elements 42 for a total of forty-nine membrane elements within the outer pressure vessel 22.

Two feed water inlets 32 are located at the feed end 26 (upstream end) of the vessel system 20 through which unpurified water is introduced to the interior of the outer pressure vessel 22 and distributed to the individual flow distribution tubes 40 containing the multiple membrane elements 42 for desalination. Saline feed water enters the vessel system 20 through the two four-inch symmetrical circular stainless-steel side ports 32 (the feed inlets). The symmetrical axial flow created by the feed inlets 32 in the outer vessel 22 facilitates uniform, hydraulically efficient distribution of the saline feed water into the seven sets of membrane elements 42 contained in the outer pressure vessel 22 and located in individual flow distribution tubes 40. Two concentrate or brine water outlets 34 are located at the outlet end 30 (downstream end) of the vessel system 20 through which flows processed but still unpurified water. The main purpose of the "brine outlets" is to collect and convey all brine generated from the forty-nine RO membrane elements 42 out of the pressure vessel 22. Permeate outlets 52 are located at the feed end 26 in this embodiment out of which flow product water (purified water). While the drawing numeral 52 is meant to indicate all seven adjacent product water outlets (one for each of the seven flow distribution tubes 40), only one numeral and one lead line are used in order to preserve clarity in the drawing.

At the feed end 26 of the vessel system 20 there can also be seen a feed end flow distribution plate 56 having feed bypass slots 58. In this embodiment they are shown as being circular but they can take other forms. These slots permit feed water to surround the outside of the internal flow tubes 40 within the outer pressure vessel 22 so that the feed water may enter each of the RO membrane elements 42 in parallel. The main purpose of this plate is to obtain uniform distribution of the feed flow of saline into each of the seven RO flow distribution tubes 40. The feed end flow distribution plate also provides support for the seven flow tubes.

The configuration and size of the slots 58 of the feed flow plate 56 are designed such that they direct only a small portion of the total feed flow into the first set of seven front RO membrane elements 42 located in the distribution tubes 40. The remaining feed flow bypasses the first set of seven membrane elements and is conveyed for distribution to the downstream RO membrane elements. For that purpose, each of the flow distribution tubes 40 includes multiple radial flow distribution slots 46 located at the upstream end of each RO membrane element 42 (more clearly seen in FIG. 5 and discussed below). Only one flow distribution slot is indicated by the numeral 46 in this figure so as to preserve clarity of the figure, but all are meant to be indicated.

In this embodiment, each flow distribution tube 40 includes seven RO membrane elements 42, although in other embodiments, more or fewer may exist. Because of these aspects of the invention, the unpurified feed water surrounds all seven internal flow distribution tubes 40 simultaneously and enters all RO membrane elements 42 simultaneously. The feed end flow distribution plate 56 also includes axial/serial inlet slots 72 (FIG. 8) through which unpurified feed water 36 is directed to the farthest upstream RO membrane elements 42 within each flow distribution tube 40.

The vessel system 20 configuration is specifically designed to accomplish more uniform water production from each of the membrane elements 42 within the flow distribution tubes 40 and thereby to achieve more efficient use of the energy applied for desalination as well as to yield higher average fresh water production flow from the same number of RO membrane elements. The diameters or openings of the flow distribution slots 46 formed on the feed side (farthest upstream end) of each of the RO elements 42 is increased along the length of the outer pressure vessel 22 from feed end 26 to outlet end 30 of the outer pressure vessel such that each subsequent set of seven membrane elements receives a larger portion of the feed flow to balance the osmotic pressure within the vessel system 20. That is, the openings of the flow distribution slots at the upstream end of each flow distribution tube are smaller than the openings of the flow distribution slots at the downstream end of the flow distribution tube.

Figure 1:
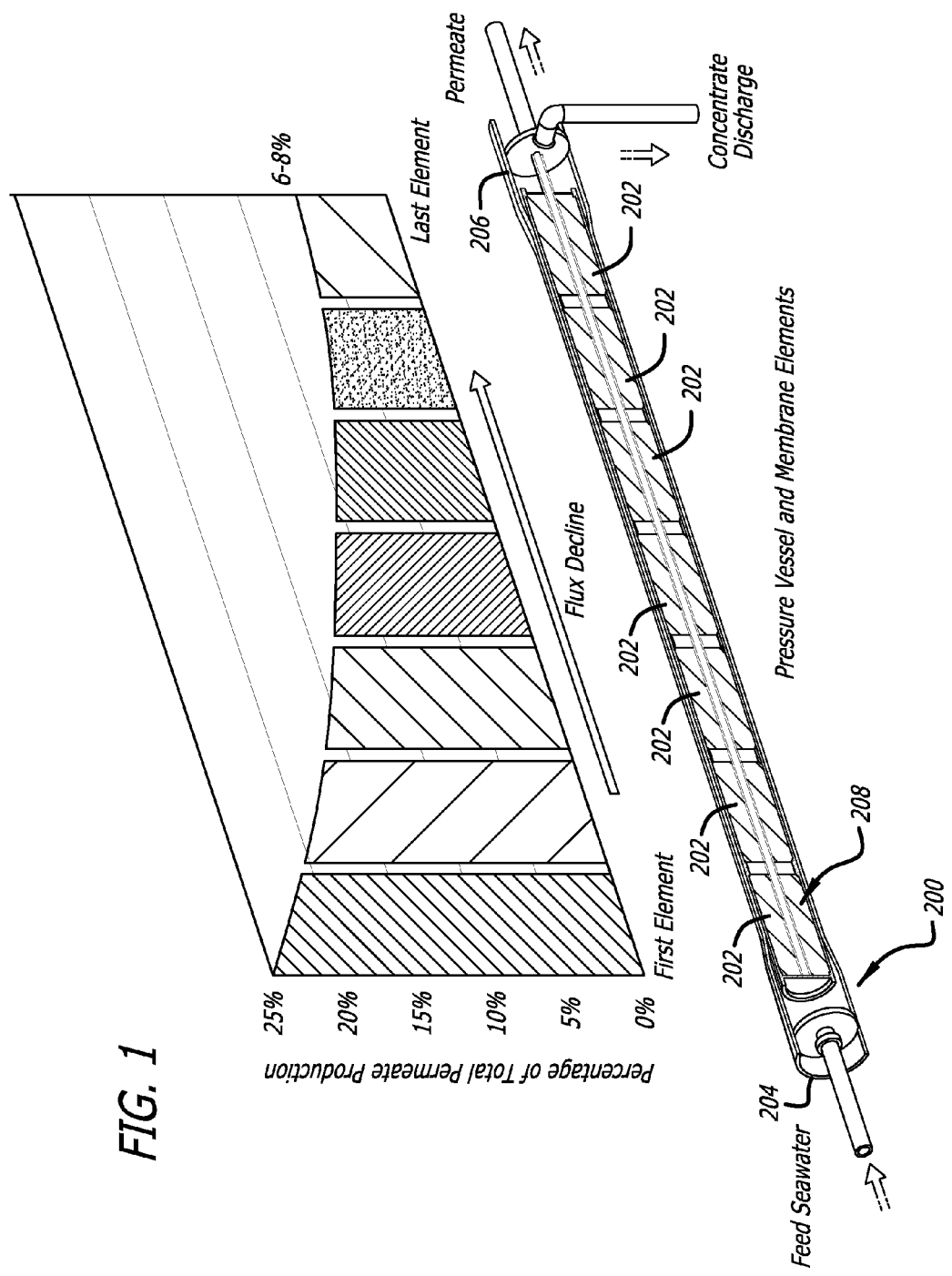
FIG. 1 presents a prior art conventional RO membrane vessel and a graph demonstrating the flux decline associated therewith.
Figure 2:
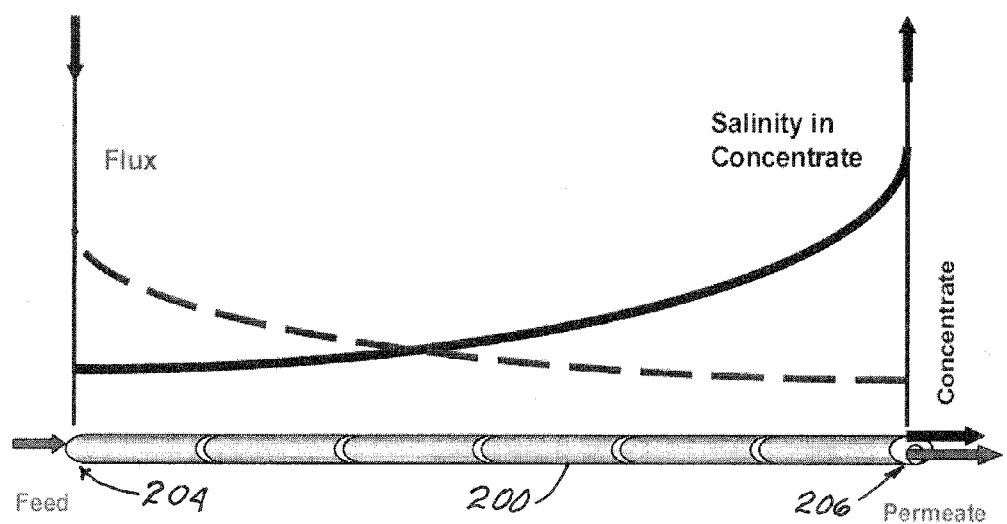
FIG. 2 shows a RO membrane vessel showing the cross over of the decrease in flux with the increase in salinity in concentration.

This feature of the vessel system 20 in which it houses seven sets of seven serial membrane elements in this embodiment, rather than one set of six to eight membrane elements per pressure vessel in the prior art (FIGS. 1 and 2) allows more fluid to be processed. This feature yields significant capital cost savings because it allows elimination of the costly high-quality stainless steel distribution piping, valves and fittings needed to deliver the saline feed water to the individual pressure vessels and to convey the fresh water (permeate) and concentrate generated in the vessels. FIG. 12 provides an example illustration of an RO train 240 using the vessel system described above, which has the same fresh water production capacity as the conventional eight-inch pressure vessels shown in FIG. 3 but in a much reduced space and at a reduced cost, as is discussed below in further detail.

FIG. 5 is a schematic diagram of part of FIG. 4 showing the flow of unpurified feed water 36 into the vessel system 20 and the osmotic pressure balancing effect achieved by diluting the feed/brine concentration for each membrane element 42 operating serially with untreated feed water being introduced to the upstream or feed end 60 of each membrane element 42. FIG. 5 is not meant to be an accurate depiction of FIG. 4 in that various components of FIG. 4 have been removed so that general concepts can more clearly be shown. It is a schematic view. The feed water enters the membrane elements 42 both at their axial feed ends (shown in dashed lines) and at their radial flow distribution slots 46 (only one of which is indicated by the numeral for clarity of illustration purposes) located at the upstream end 60 of each membrane element 42. Untreated feed water entering the downstream membrane elements through their radial flow distribution slots 46 has a lower osmotic pressure than the osmotic pressure of the concentrate exiting from each membrane element 42 operating sequentially, thus balancing the osmotic pressure to all membrane elements operating sequentially within an individual flow balancing tube 40. The untreated sea water feed 36 can be blended with the concentrated feed/brine of the RO membrane elements because the pressure within the outer pressure vessel 22 is greater than the pressure within each of the flow balancing tubes 40 housing the membrane elements 42. Only two flow distribution tubes 40 are shown in this figure, however, it will be noted in other figures that other numbers of tubes may be used. Concentrate/brine 66 leaving the flow distribution tubes 40 at the downstream end 64 is channeled away from the vessel system 20 through the brine water outlets 34 (see FIG. 4 also).

The flow distribution tubes 40 have three key functions: (1) to facilitate continuous uniform unidirectional flow of the feed water/concentrate within the outer pressure vessel 22; (2) to distribute flow uniformly to the seven RO membrane elements 42 installed within the tube 40; and (3) to balance the feed pressure within the flow tube 40 such that each membrane element is exposed to reduced net driving pressure and produces a similar volume of permeate.

The flow distribution tubes 40 are bundled together within the outer pressure vessel 22 with a tube support at each vessel end and the center, which are referred to as the feed and flow distribution plate (upstream end), the center plate, and the brine plate (downstream end). The simplified cut-away shown on FIG. 5 indicates the distribution patterns of the feed flow through the outer vessel 22.

FIG. 6 is a schematic end-on diagram of seven cylindrical flow distribution tubes 40 contained within an outer pressure vessel 22. Six tubes 40 form an outer circle array and thereby create spaces or cavities between each tube and the wall of the outer pressure vessel. A center tube is located within the array and creates bypass spaces or cavities between it and the other six tubes. These spaces are denoted as bypass flow paths, a few of which are indicated by drawing numeral 62, in that they permit pressurized inlet feed water 36 to surround each of the cylindrical flow distribution tubes 40. This also enables the feed water to flow into all RO membrane elements 42 through their radial flow distribution slots 46 achieving the lower osmotic pressure and flow balancing described above. The feed plate 56 shown in FIG. 4 has four large openings 58 for bypassing a portion of the feed water between the inner wall of the pressure vessel 22 and the outer surfaces of the six outer flow-distribution tubes, and six medium-size openings 84 to direct bypass feed flow between the central seventh flow distribution tube 40 and the outer six tubes (see FIG. 10 also). Only one opening is indicated by the numeral 84 to preserve clarity in the illustration of an embodiment. The placement and the size of the openings may be altered in other embodiments.

Figure 7:
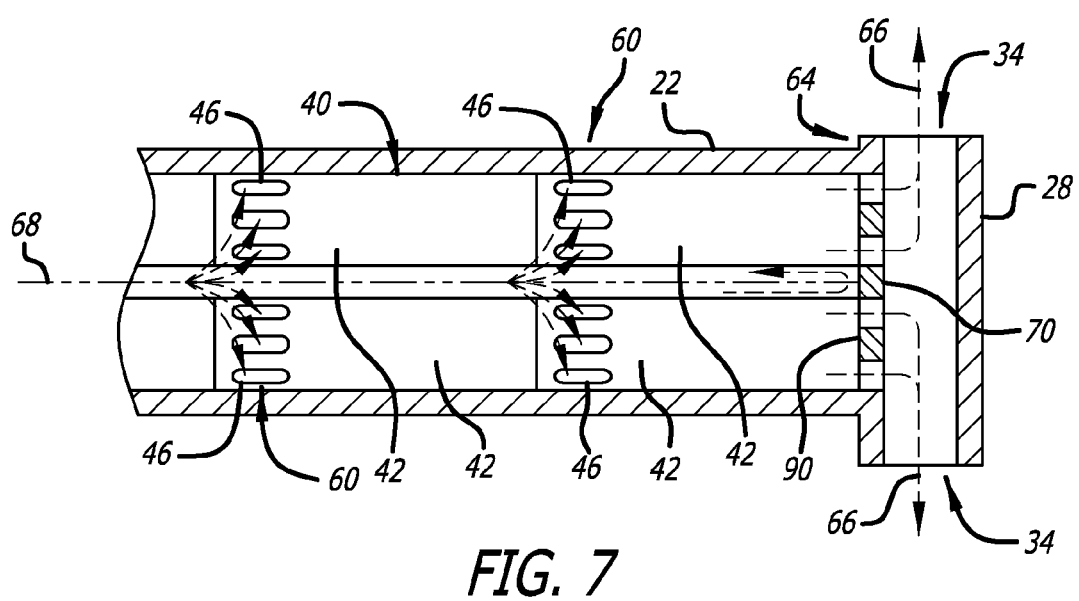
FIG. 7 is a partial cross-sectional side view of the farthest downstream end of the multi-ported vessel of FIGS. 4 and 5 showing the entry of bypass fluid into RO membrane elements through their radial flow distribution slots, the flow of brine fluid from those membrane elements out of the vessel, and the retention of the bypass inlet unpurified water within the bypass flow paths by a sealing wall.
Figure 8:
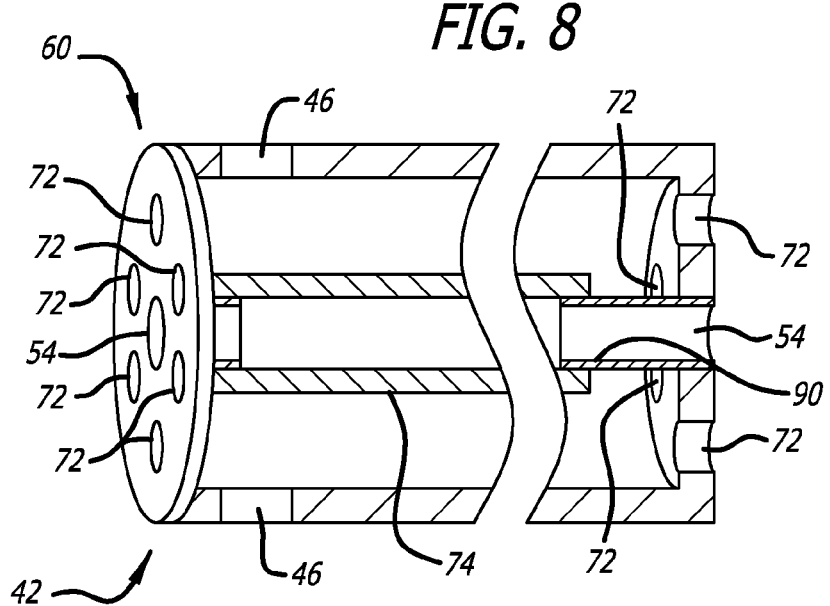
FIG. 8 is a schematic view of an RO membrane element showing the axial serial inlets and outlets, the product water tube, the membrane, and the radial feed distribution slots.
Figure 9:
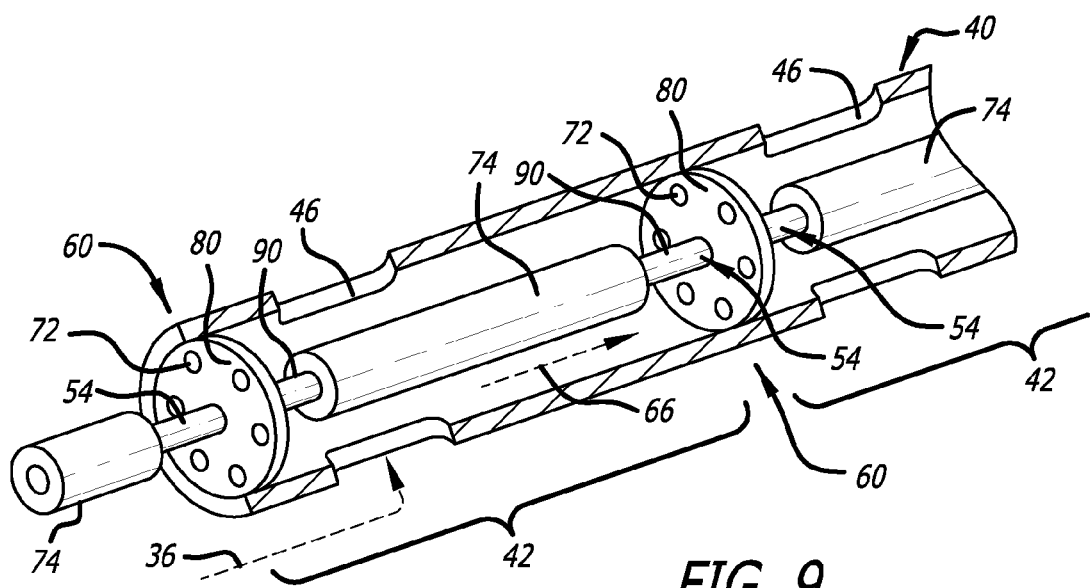
FIG. 9 is a partially cut-away view of two serial RO membrane elements located in the same flow distribution tube showing the use of thrust-interconnection plates located between two membrane elements and used to interconnect sequential RO membranes, the plates having cross-flow slots formed therein so that inlet feed water flows between the flow distribution tubes, and also showing the radial flow distribution slots formed in the outer wall of the flow distribution tube at the upstream end of each membrane element in that tube.

FIG. 7 is a partial cross-sectional side view of the downstream end 64 of the multi-ported pressure vessel system 20 showing the entry of bypass water 68 into the RO membrane elements 42 through their radial flow distribution slots 46, the flow of brine fluid 66 from those membrane elements out of the vessel through the brine outlets 34, and the retention of the bypass water 68 within the bypass flow paths by a sealing wall 70. At the sealing wall 70 shown in FIG. 7, it will be seen that the bypass water does not escape but instead is retained in the bypass flow paths for processing by the RO membrane elements 42. This is shown by means of an arrow having a lead line that turns on itself by 180°. The sealing wall 70 may be implemented by the use of a brine plate 90 that not only provides the sealing wall between each flow distribution tube 40 but also provides slots located at positions in the RO membrane elements for the flow of brine out of the farthest downstream RO membrane elements, and also support for the product water tube 54 (FIGS. 8 and 9). The brine plate is blanked and sealed against the flow of the tube bundle so that the concentrate is removed through the concentrate outlets 34. FIG. 7 shows two RO membrane elements 42 arranged in series within two respective flow distribution tubes 40 with radial flow distribution slots 46 at each of their upstream ends 60.

Referring now to FIG. 8, there is shown a schematic view of a single RO membrane element 42 showing the axial serial inlets and outlets 72, the product water tube 54, the RO membrane 74, and the radial flow distribution slots 46. The diagram is not to scale and is primarily meant to illustrate various concepts of the embodiment.

FIG. 9 shows two RO membrane elements 42 in series, each of which includes a membrane 74 and radial flow distribution slots 46 at its upstream end 60. The outer surface of each RO membrane element forms the flow distribution tube 40 surface in this embodiment. Individual RO membrane elements 42 are formed within the flow distribution tube 40 by the positioning of interconnector-thrust rings 80 within the flow distribution tube 40. The interconnector-thrust rings 80 include portions of the product water tube 54 in the form of fittings 90 extending from other side of the ring itself, the fitting providing mounting surfaces for respective RO membranes 74. The fitting therefore connects one membrane 74 of one RO membrane element 42 to the membrane 74 of a sequential or preceding RO membrane element 42. This is also applicable for FIG. 8.

The interconnector-thrust rings 80 also include axial serial inlet/outlet slots 72 through which concentrated/brine water 66 from the preceding upstream RO membrane elements flows. Concentrate created in the first RO element of each permeate tube is conveyed axially through an interconnector-thrust ring to the downstream second RO element. Similarly, concentrate from the second element is conveyed in an axial direction through the next downstream element and this process continues until concentrate from all seven elements is discharged through the brine water outlets 34 of the vessel system 20.

As pointed out above, all flow distribution tubes 40 have seven sets of orifices 46 (flow distribution slots), one set for each membrane 42. Each of the sets is located just downstream of the interconnector-thrust rings 80 connecting adjacent membrane elements within the tube. The diameter of the orifices 46 formed in the flow distribution tubes increases from the feed end of the tube to the most downstream end of the tube and is designed to provide approximately the same feed flow to each of the forty-nine membrane elements located within the outer vessel 22. In that regard for FIG. 9, the flow distribution slots 46 for the left member element 42 have a smaller opening size than the slots 46 of the right element 42 of the drawing.

Due to the radial flow distribution slots 46 disposed in each RO membrane element, unconcentrated feed water 36 can also enter the feed/brine stream 66 of any RO membrane element 42 because the pressure within the outer pressure vessel 22 is greater than the feed/brine pressure thereby diluting the brine from the upstream membrane element 42 with un-concentrated feed water 36, to feed the subsequent membrane element 42 with a diluted solution of feed water, thereby reducing the osmotic pressure and increasing the NDP to each down-stream membrane element 42 to achieve flow balancing of all membrane elements 42 operating in series within an individual flow balancing tube 40. In one case of prior art, the faces of serially-located membranes are mated flush. This does not permit the dilution downstream for lowered osmotic pressure as provided by the invention.

Figure 10:
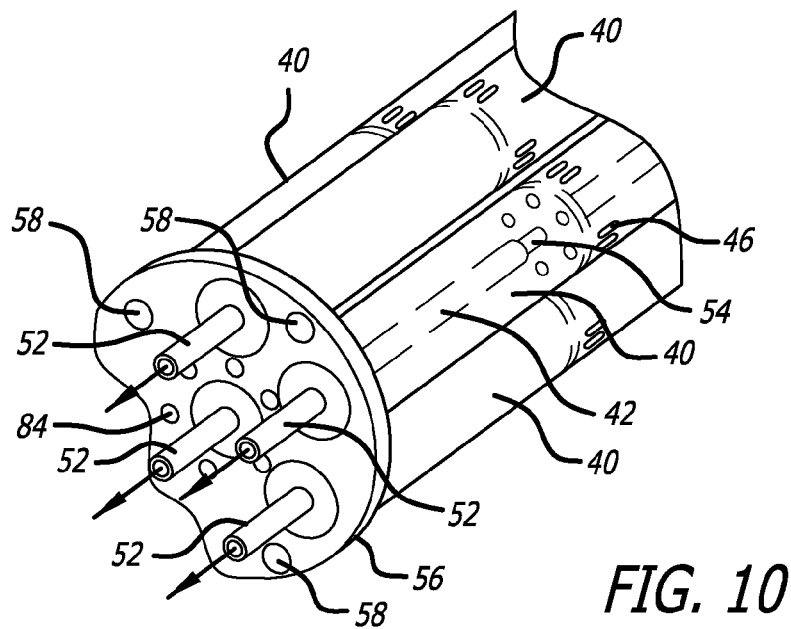
FIG. 10 is a partial upstream, cut-away, end-on perspective view of the feed inlet of the vessel showing axial feed inlets for the membrane elements, feed bypass slots as well as the product water tube of each flow distribution tube connected to a respective product water output.

Turning now to review FIG. 10, the purpose of the product water outlets 52 is to collect all permeate generated in the vessel system 20. These outlets are manufactured of polyvinylchloride (PVC) in one embodiment and are installed into each of the permeate tubes 40.

Figure 11:
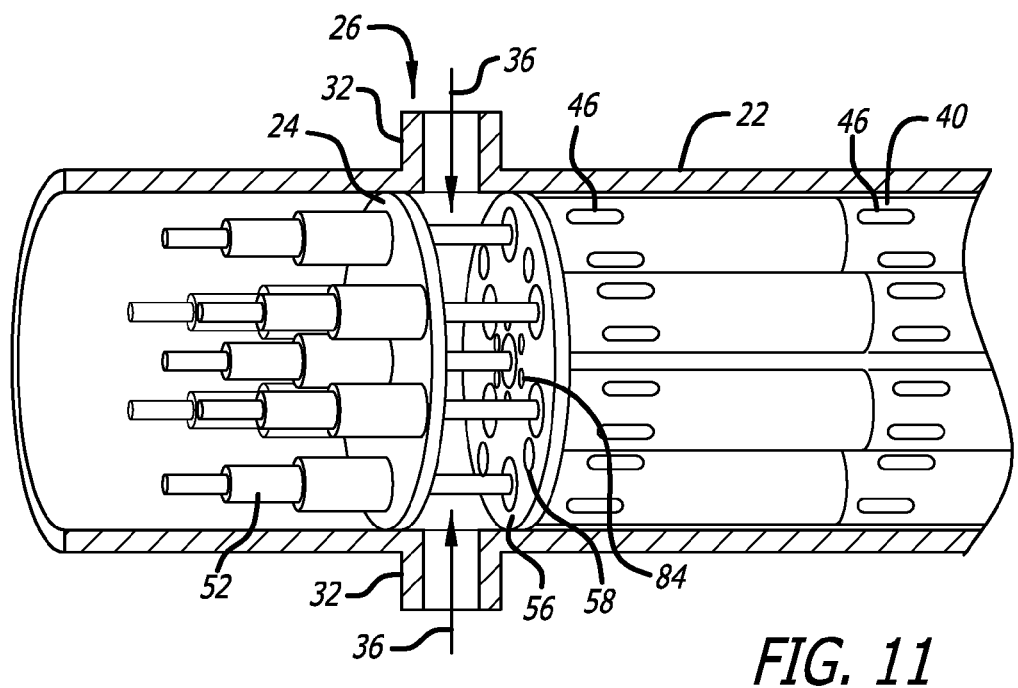
FIG. 11 is a side perspective view of partial cross-section from the untreated water inlet end of the multi-ported vessel with the outer pressure vessel in cross section showing the product water tubes of the flow distribution tubes connected to product water outlets, also showing the feed water inlets to the pressure vessel.

Turning now to FIG. 11, the feed water inlets 32 and the product water outlets 52 are shown in a partially cut away and cross-sectioned vessel. The feed end flow distribution plate 56 with bypass holes 48 and 84 is also shown. Unpurified inlet water 36 is input to the vessel through the feed water inlets 32. That feed water is directed to both bypass the flow distribution tubes 40 through feed bypass slots 58 and 88 to enter the flow distribution tubes and consequently the RO membrane elements through axial inlets 72. The product water tubes 54 of the flow distribution tubes 40 and the permeate outlet ports (purified water ports) are shown. Also shown are the radial flow distribution slots 46 of multiple RO membrane elements.

Returning to FIG. 4, the vessel system 20 is shown such that some components can be viewed through the outer pressure vessel wall 22. In this embodiment, the outer pressure vessel 22 is a twenty-five inch diameter vessel constructed of fiberglass-reinforced plastic, although other embodiments are possible. The pressure vessel includes a feed end cap 24 at the inlet end 26 and a brine end cap 28 at the concentrate/brine outlet end 30. The inlet end includes feed-inlet ports 32 through which unpurified water is introduced into the outer pressure vessel 22 for desalination. Purified permeate water is removed from the pressure vessel through the permeate outlet ports 52 for each individual flow distribution or balancing tube 40. The membrane elements 42 may be made in a variety of configurations known to those with skill in the art, including the common configurations of a spiral-wound membrane element and a hollow-fiber membrane element.

Permitting parallel feed to the membrane elements 42 in accordance with an aspect of the invention lowers the pressure drop across the lead membrane elements, prevents overfluxing of the membrane lead elements, and provides more even flux distribution across all the membrane elements. Another advantage is that this parallel feed system and method distributes a uniform osmotic pressure into all of the membrane elements operating inside the flow balancing tubes 40 at the same time.

System Operation

The entire volume of saline feed water enters the vessel system 20 through the feed water inlets (stainless steel vessel side ports) 32 shown in FIG. 4. The feed flow then passes through the feed end flow distribution plate 56, which uniformly distributes this saline feed flow into the bypasses or cavities 62 formed between the inner wall of the outer pressure vessel 22 and the walls of the seven individual flow distribution tubes 40 located within the vessel. This feed water enters simultaneously into all forty-nine membrane elements 42 of the vessel 22 through the radial distribution slots 46 located on the front end of the membrane elements. Since the diameter of the radial distribution slots increases from the feed end 26 to the outlet end 30 of the vessel, the increasing friction headlosses along the length of the vessel are compensated by the smaller entrance headlosses through the radial distribution slots 46 which is achieved by using larger diameter slots 46 towards the outlet end. As a result, the feed flow is more uniformly distributed to each membrane element 24, the net driving pressure and production rate of the first two membrane elements is reduced, while the net driving pressure and production rate of the last several elements is increased.

The concentrate exiting the first set of seven RO elements contains elevated salinity and osmotic pressure. As this concentrate exits each of the first seven RO elements, it is directed axially through the interconnector-thrust rings into the second downstream element within the same flow distribution tube. The second RO membrane element also receives raw saline feed water through the radial flow distribution slots 46. This lower salinity feed water entering the radial distribution slots dilutes the concentrate from the first (and each subsequent) RO element and lowers the feed salinity and osmotic pressure processed by the downstream RO element.

The untreated feed saline water entering the downstream RO element can be blended with the concentrate from the upstream RO element because the pressure in the cavities between the inner wall of the Mega-Vessel and the outer wall of the pressure tubes is greater than the pressure within the flow distribution tube. This mechanism of balancing of the feed osmotic pressure and NDP of each of the RO elements allows maximizing the fresh water production of these elements. In addition, the reduced feed flowrate through the first and second set of RO elements lowers significantly the pressure drop (friction headlosses) across these elements which in turns results in lower energy use for desalination and increased use of the production capacity of the membrane vessels.

Some of the key benefits of the vessel system 20 in accordance with aspects of the invention as compared to all other known conventional and novel state-of-the-art RO membrane desalination systems are:
higher fresh water production capacity and/or lower energy use;
smaller site footprint;
lower RO system costs;
reduced membrane cleaning frequency; and
easier RO system fabrication, assembly and maintenance.

Depending on the type of desalination process (nanofiltration, brackish water reverse osmosis or salt water reverse osmosis) the vessel system 20 in accordance with the invention can yield 10% to 30% of higher fresh water production or lower energy use as compared to conventional pressure-vessel based desalination systems that contain the same number of standard eight-inch membrane elements. The use of the vessel system 20 for seawater reverse osmosis desalination renders the greatest energy savings/water production increased benefit. However, the vessel system 20 desalination has significant cost, productivity and energy advantages for nanofiltration and brackish water desalination as well.

Figure 3:
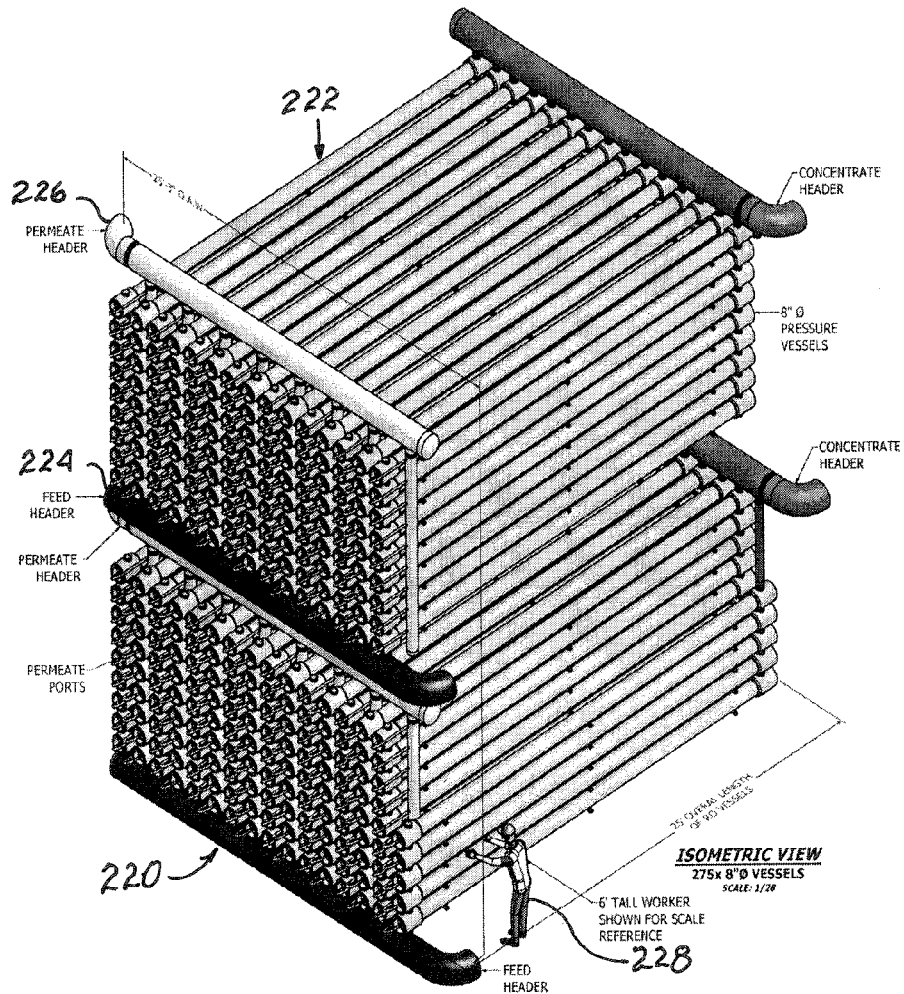
FIG. 3 shows a conventional RO membrane train having a plurality of RO membrane tubes connected together with various headers to produce filtered water.

At present, the most commonly used membrane reverse osmosis systems consist of individual fresh water production trains (also known as membrane racks or modules) which house a number of vessels containing six to eight (typically seven) eight-inch membrane elements installed in series inside the pressure vessel, such as that shown in FIG. 3. The smallest size RO system includes only one RO train (skid) with one pressure vessel while the largest size RO trains often contain 100 to 300 membrane vessels. However, a twenty-five inch vessel system 20 in accordance with aspects of the invention has seven times more RO membranes than a conventional eight-inch pressure vessel (i.e., 49 vs. 7 membrane elements). As a result, the number of feeds, product water and concentrate piping, valves, fittings, instrumentation, and controls are reduced seven times as well. This membrane system component reduction, along with the more simplified and compact membrane support racks of the vessel system 20 in accordance with the invention result in RO trains of smaller total footprint.

The magnitude of footprint reduction increases with the size of the RO system. For RO trains of capacity smaller than 0.1 MGD the footprint difference is within 5%. For medium size RO trains of capacity of 0.5 MGD to 2.5 MGD the site footprint savings are 15 to 20%. For large RO trains with individual capacities of 4 MGD or more, the site footprint benefits of using a vessel system 20 instead of conventional eight-inch pressure vessels are over 25%.

As a brief comparison, the train of FIG. 3 is compared to that of FIG. 12. FIG. 3 presents a conventional large-size seawater desalination RO train 220 of 7 MGD fresh water production capacity. In this embodiment, there are two-hundred and seventy-five eight-inch pressure vessels in two tiers that form a "footprint" of 7.70 meters by 7.62 meters for a total of 58.67 m$^2$ (25.25 ft by 25.00 ft for a total of 631.25 ft$^2$). Turning now to FIG. 12, an RO train formed of vessel systems 20 in accordance with aspects of the invention has the same fresh water production capacity (i.e., 7 MGD) as the train of FIG. 3, but contains only forty twenty-five inch vessels and has a 34% smaller site footprint of 5.13 meters by 8.53 meters for a total area of 43.75 m$^2$ (16.83 ft.×28 ft.=471.24 ft$^2$). Taking into consideration that RO membrane trains typically occupy 40 to 60% of the RO building, the total building footprint savings and associated construction costs resulting from the use of the vessel system 20 desalination system in this case would be in a range of 15 to 20%.

The performance of thin-film composite membranes has been continuously evolving. In an embodiment of the vessel system 20 disclosed herein, desalination membranes that contain either individual nanometer-size particles (tubes/pores) embedded into the membrane polymer matrix, or are entirely made of clustered channels (nanotubes), termed nanostructured (NST) membranes were used. Such membranes have higher specific permeability (i.e., fresh water production rate per unit membrane area) and have comparable or lower fouling rates. Such membranes are available from NanoH$_2$O, Inc., 750 Lairport Street, El Segundo, Calif.

Thus there has been provided a new and novel desalination system and method that result in higher rates of water production, lower costs, and smaller footprints. The disclosed system and method aim to address energy and flow production constraints of current state-of-the-art RO membrane systems associated with their inherent uneven feed flow and salinity distribution. It should be noted that the invention is not meant to be limited to the reverse osmosis process but can have application to other processes as well. For example, the plurality of filter elements 42 may comprise other types of filters other than reverse osmosis membrane elements.

Terminology Listing:
BWRO—brackish water reverse osmosis
GFD—gallons per square foot per day
LMH—liters per square meter per hour
MF—microfiltration
MGD—million gallons per day
NDP—net driving pressure (to achieve reverse osmosis)
NF—nanofiltration
NST—nanostructured
permeate—pure water molecules
permeate flux—pure water flow (GFD or LMH)
permeate water flux—pure water flow (GFD or LMH)
product—pure water molecules
RO—reverse osmosis
RO membrane element—reverse osmosis membrane section/element/portion
SWRO—salt water reverse osmosis
UF—ultra-filtration While the invention has been described in connection with what is presently considered to be the most practical and preferred embodiments, it is to be understood that the invention is not to be limited to the disclosed embodiments and elements, but, to the contrary, is intended to cover various modifications, combinations of features, equivalent arrangements, and equivalent elements included within the spirit and scope of the appended claims.

What is claimed is:

1. A desalination system for desalinating feed water, the desalination system comprising:
   an outer pressure vessel having a feed inlet and a product water outlet;
   a plurality of membrane flow distribution tubes disposed serially within the outer pressure vessel, each flow distribution tube having:
      an outer surface;
      a plurality of filter elements arranged within the flow distribution tube
   wherein filter elements have a serial inlet through which feed water may flow from a previous filter element;
      a plurality of flow distribution slots formed through the outer surface of the flow distribution tube aligned with a plurality of the filter elements disposed within the tube to communicate feed water to the aligned filter elements;
      a product water tube configured to collect purified water from filter elements and communicate the purified water to the product water outlet; and
   a bypass flow path formed within the outer pressure vessel in contact with each flow distribution tube, the bypass flow path connected with the feed inlet so that feed water flows around the outer surfaces of the flow distribution tubes, whereby feed water is available to each filter element that is aligned with a flow distribution slot.

2. The desalination system of claim 1 wherein the filter elements are oriented within each flow distribution tube serially.

3. The desalination system of claim 2 wherein each filter element has an upstream end and a downstream end and the filter elements are oriented within each flow distribution tube in an end-to-end configuration.

4. The desalination system of claim 3 wherein a plurality of filter elements have a serial inlet slot at their upstream ends through which feed water may flow into said filter elements from downstream ends of previous filter elements, in addition to inlet water flowing into said filter elements through flow distribution slots.

5. The desalination system of claim 4 wherein each flow distribution tube has an upstream end and a downstream end with flow distribution slots formed in the outer surface at the upstream end having smaller openings than the openings of flow distribution slots formed at the downstream end.

6. The desalination system of claim 1 wherein the flow bypass path is configured so that inlet water flows around all distribution tubes approximately simultaneously.

7. The desalination system of claim 6 wherein all filter elements of each flow distribution tube are aligned with radial flow distribution slots whereby inlet water from the flow bypass path is available to all filter elements approximately simultaneously.

8. The desalination system of claim 7 wherein inlet water is available approximately simultaneously to the plurality of filter elements having aligned flow distribution slots.

9. The desalination system of claim 1 wherein a plurality of flow distribution slots are aligned with each filter element.

10. The desalination system of claim 1 wherein each filter element has an upstream end at which the radial slots are formed such that feed water will flow into the filter element at its upstream end and be filtered while traversing the filter element.

11. The desalination system of claim 10 wherein each flow distribution tube has an upstream end and a downstream end with flow distribution slots formed in the outer surface at the upstream end having smaller openings than the openings of flow distribution slots formed at the downstream end.

12. The desalination system of claim 1 wherein the filter elements comprise reverse osmosis membrane elements.

13. A desalination system for desalinating feed water, the desalination system comprising:
an outer pressure vessel having a feed inlet and a product water outlet;
a plurality of membrane flow distribution tubes disposed within the outer pressure vessel, each flow distribution tube having:
an outer surface;
a plurality of filter elements arranged in an end-to-end configuration within the flow distribution tube;
a plurality of radial flow distribution slots formed through the outer surface of the flow distribution tube aligned with each of the filter elements disposed within the tube to communicate feed water to the aligned filter elements;
wherein the filter elements have a serial inlet slot at an upstream end through which feed water may flow into said filter element from downstream ends of previous filter elements;
wherein each flow distribution tube has an upstream end and a downstream end with the radial flow distribution slots formed in the outer surface at the upstream end having smaller openings than the openings of flow distribution slots formed at the downstream end;
a product water tube configured to collect purified water from filter elements and communicate the purified water to the product water outlet; and
a bypass flow path formed within the outer pressure vessel in contact with each flow distribution tube, the bypass flow path connected with the feed inlet so that feed water flows around the outer surfaces of the flow distribution tubes approximately simultaneously and enters each of the radial flow distribution slots, whereby feed water is available to each filter element approximately simultaneously.

14. The desalination system of claim 13 wherein the filter elements comprise reverse osmosis membrane elements.

15. A method of desalinating feed water, the method comprising:
directing pressurized feed water into a plurality of individual membrane filter elements arranged serially within a flow distribution tube, the flow distribution tube located within a housing and having an upstream end and a downstream end;
wherein the step of directing includes introducing feed water into the upstream end of the flow distribution tube;
wherein the step of directing also includes introducing feed water directly into the individual filter elements in parallel through slots provided in the flow distribution tube;
conducting the feed water serially through the individual filter elements;
filtering the feed water by the filter elements one by one in series;
mixing feed water introduced into the filter elements in parallel with the serially filtered water in the filter elements whereby salinity concentration is lowered in said filter elements;
collecting purified water from the filter elements; and
outputting the purified water.

16. The method of desalinating of claim 15 wherein the step of introducing feed water directly into the individual filter elements in parallel comprises introducing more feed water directly into the individual filter elements that are located downstream than the amount of feed water introduced directly to the more upstream individual filter elements.

17. The method of desalinating of claim 16 further comprising the steps of:
directing pressurized feed water into a plurality of flow distribution tubes, each tube having individual filter elements arranged serially, each flow distribution tube having an upstream end and a downstream end;
wherein the step of directing includes introducing feed water into the upstream end of each of the flow distribution tubes approximately simultaneously;
wherein the step of directing also includes introducing feed water directly and separately into all the individual filter elements of the plurality of flow distribution tubes in parallel approximately simultaneously;
conducting the feed water serially through the individual filter elements;
filtering the feed water by the filter elements one by one in series;
mixing feed water introduced into the filter elements in parallel with the serially filtered water in the filter elements whereby salinity concentration is lowered in said filter elements;
collecting purified water from all the filter elements; and
outputting the purified water.

18. The method of desalinating of claim 15 wherein the step of filtering feed water comprises filtering by reverse osmosis.

* * * * *